United States Patent [19]

O'Brien et al.

[11] Patent Number: 5,271,437
[45] Date of Patent: Dec. 21, 1993

[54] AEROSOL CAN WASTE DISPOSAL DEVICE

[75] Inventors: Michael D. O'Brien; Robert L. Klapperick; Chris Bell, all of Las Vegas, Nev.

[73] Assignee: The United States of America as represented by the Department of Energy, Washington, D.C.

[21] Appl. No.: 932,118

[22] Filed: Aug. 19, 1992

[51] Int. Cl.⁵ .................. B65B 31/00; B65B 7/24
[52] U.S. Cl. ........................ 141/51; 141/65; 141/97; 141/329; 141/89; 222/83.5; 222/86; 222/397; 30/448
[58] Field of Search ............ 141/65, 51, 98, 129, 141/329, 330, 18, 20, 1, 7, 97, 89–92, 165; 81/3.07, 3.2; 222/80, 81, 83, 83.5, 87, 86, 387; 100/102; 29/403.1, 403.7, 426.1, 426.3, 244, 801; 422/900; 30/448

[56] References Cited

U.S. PATENT DOCUMENTS

| | | | |
|---|---|---|---|
| 3,303,968 | 2/1967 | Compere | 222/82 |
| 3,333,735 | 8/1967 | Odasso | 222/5 |
| 3,662,791 | 5/1972 | Ruscitti | 141/65 |
| 3,817,302 | 6/1974 | Kowal et al. | 141/383 |
| 3,920,162 | 11/1975 | Kimura | 222/182 |
| 4,166,481 | 9/1979 | Farris | 141/51 UX |
| 4,349,054 | 9/1982 | Chipman et al. | 141/1 |
| 4,407,341 | 10/1983 | Feldt et al. | 141/97 |
| 4,459,906 | 7/1984 | Cound et al. | 100/45 |
| 4,500,015 | 2/1985 | Penney | 141/51 UX |
| 4,526,097 | 7/1985 | Cound | 100/215 |
| 4,944,333 | 7/1990 | Gold et al. | 141/51 |
| 5,114,043 | 5/1992 | Collins | 222/86 |

FOREIGN PATENT DOCUMENTS 1607991 10/1970 Fed. Rep. of Germany ........ 141/65

Primary Examiner—Ernest G. Cusick
Attorney, Agent, or Firm—Miguel A. Valdes; Roger S. Gaither; William R. Moser

[57] ABSTRACT

Disclosed is a device for removing gases and liquid from containers. The device punctures the bottom of a container for purposes of exhausting gases and liquid from the container without their escaping into the atmosphere. The device includes an inner cup or cylinder having a top portion with an open end for receiving a container and a bottom portion which may be fastened to a disposal or waste container in a substantially leak-proof manner. A piercing device is mounted in the lower portion of the inner cylinder for puncturing the can bottom placed in the inner cylinder. An outer cylinder having an open end and a closed end fits over the top portion of the inner cylinder in telescoping engagement. A force exerted on the closed end of the outer cylinder urges the bottom of a can in the inner cylinder into engagement with the piercing device in the bottom of the inner cylinder to form an opening in the can bottom, thereby permitting the contents of the can to enter the disposal container.

12 Claims, 3 Drawing Sheets

AEROSOL CAN WASTE DISPOSAL DEVICE

BACKGROUND OF THE INVENTION

The invention described herein arose in the course of, or under, Contract No. DE-AC08-88NV10617 between the United States Department of Energy and EG&G Energy Measurements, Incorporated.

This invention relates to disposal of spent aerosol containers and spent paint and solvent containers and the like. More particularly, this invention relates to an apparatus for removal of gas and liquid from such containers.

With the environmental awareness concerning aerosols, solvents and volatile materials escaping into the atmosphere, there have been many attempts to dispose of cans containing such materials. For example, U.S. Pat. No. 3,333,735 discloses an apparatus for exhausting gases from an aerosol container provided the container is placed in the device in an inverted position. However, such device is deficient in that residual liquid in such inverted container cannot be removed safely.

Other devices disclosed for removing or exhausting gases from aerosol containers include U.S. Pat. No. 3,303,968 which discloses a hand-held tool for piercing the aerosol container; U.S. Pat. No. 3,920,162 which discloses a device to allow natural release of residual gas in an aerosol container by keeping the aerosol button depressed; and U.S. Pat. No. 4,459,906 which discloses an apparatus for evacuating and compacting an aerosol can wherein a hydraulic ram pushes the can against a stator plate and a reciprocating punch punctures the bottom of the can. Various other devices are disclosed in U.S. Pat. Nos. 3,662,791; 3,817,302 and 4,526,097 which facilitate removal of the gases from aerosol containers.

Yet still, there is a great need for an inexpensive device which is suitable for removing gases and liquids from aerosol paint and solvent containers which removes both the gases and liquids from such containers without gases escaping therefrom into the environment. The present invention provides such a device.

SUMMARY OF THE INVENTION

It is an object of this invention to provide a device for removing gases and liquid from containers.

It is another object of this invention to provide a device which punctures the bottom of a container for purposes of exhausting gases and liquid from the container without their escaping into the atmosphere.

In accordance with these objects, a can or container waste disposal apparatus is provided which includes an inner cup or cylinder having a top portion with an open end for receiving a container, the inner cylinder having a bottom portion having means for fastening the inner cylinder to a disposal or waste container in a substantially leak-proof manner. A piercing means is mounted in the lower portion of the inner cylinder for puncturing the bottom of a can placed in the inner cylinder. An outer cylinder is provided having an open end and a closed end, the outer cylinder engaging the top portion of the inner cylinder in telescoping engagement. When the outer cylinder is pushed down over the inner cylinder, the inner surface of the closed end of the outer cylinder forces the bottom of the can into engagement with the piercing means in the inner cylinder to form an opening in the can bottom, thereby permitting the contents of the can to enter the disposal container.

DETAILED DESCRIPTION OF THE INVENTION

Figure 1:
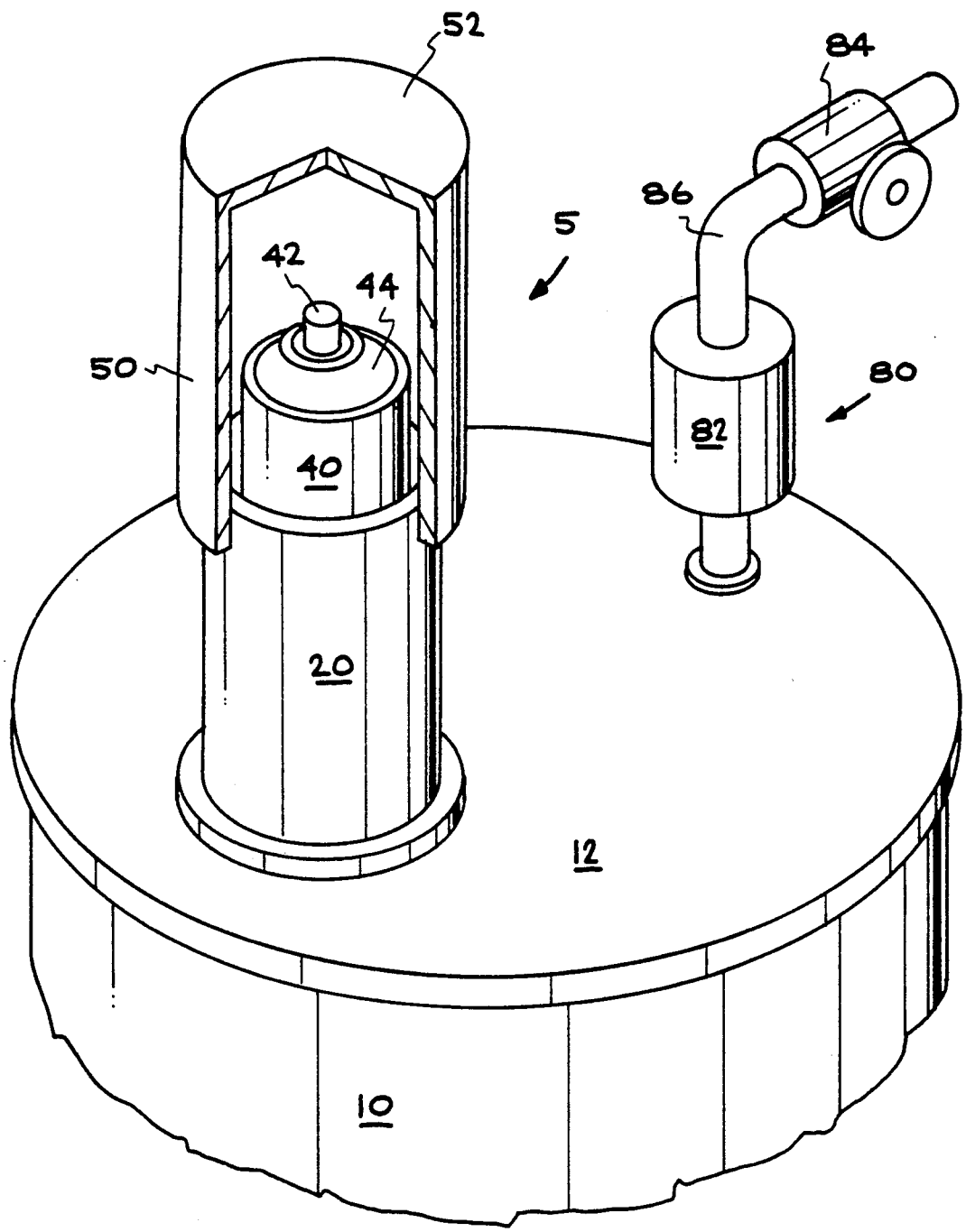
FIG. 1 is a perspective view of an aerosol can disposal device attached to a waste container.

FIG. 1 shows an aerosol can waste disposal device 5 in accordance with the invention attached to a waste container 10 such as a conventional 55 gallon drum. Can waste disposal device 5 comprises an inner cylinder 20 which is attachable to waste container 10 by suitable attachment means which may comprise mating threads on container 10 and cylinder 20, e.g., male threads 22 on cylinder 20 receivable in the conventional large threaded opening found in 55 gallon drums. However, any attachment means capable of fastening inner cylinder 20 securely to end 12 of waste container 10 may be used.

An aerosol can 40 is shown inserted in inner cylinder 20. Can waste disposal device 5 further comprises an outer cylinder 50 adapted for telescopically engaging or sliding over inner cylinder 20. Outer cylinder 50 has a closed end 52 which engages top 44 of aerosol can 40 (after removal of button 42 therefrom), when a downward force is applied to outer cylinder 50, to force the bottom of aerosol can 40 onto a piercing or puncturing means 30 (shown in FIGS. 2 and 3) which punctures the bottom of aerosol can 40 to thereby permit the contents to be exhausted from aerosol can 40 into container 10.

Also shown in FIG. 1 is a gas exhausting means 80 which may be used to remove gases from waste container 10. Gas exhausting means 80, may comprise a filter container 82, containing a suitable adsorbent therein selected to remove harmful ingredients from the gases. A valve 84 may be positioned on an outlet pipe 86 which, in turn, may connect gas exhausting means 80 to another suitable container or to a pump (not shown).

Figure 2:
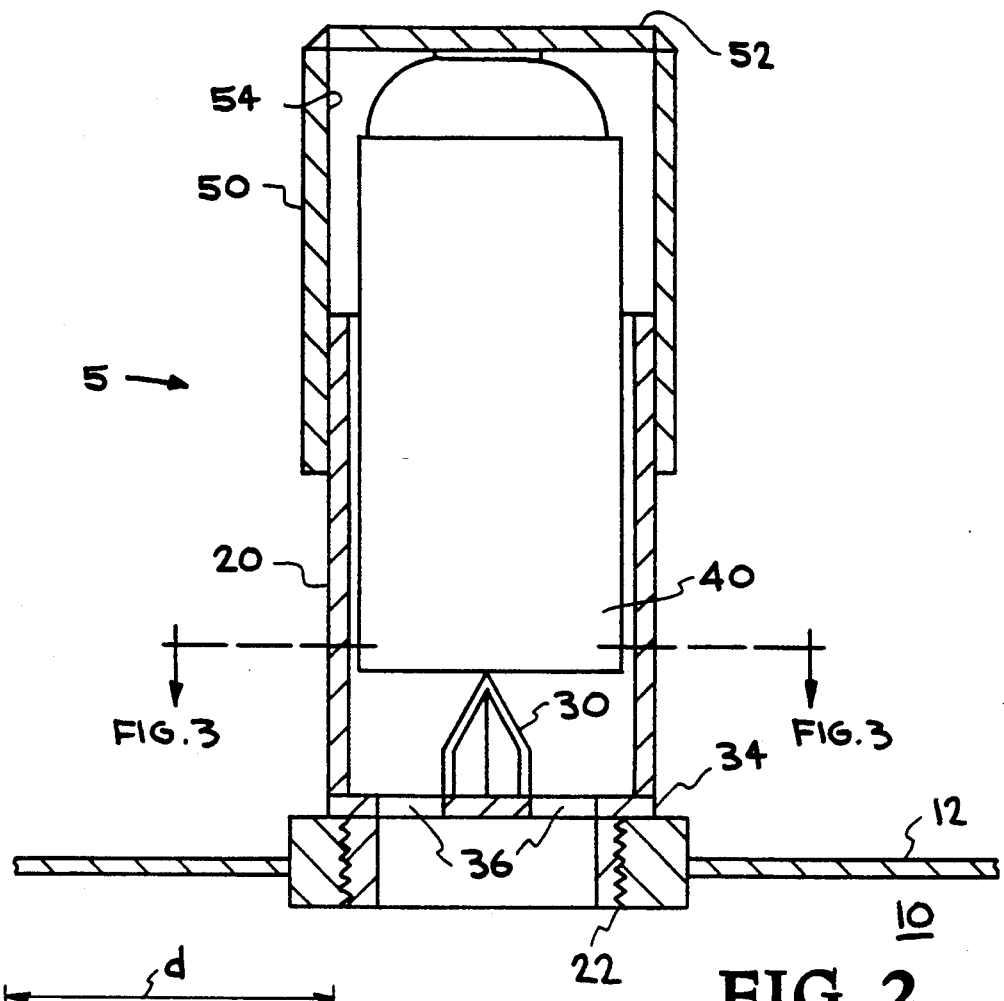
FIG. 2 is a vertical cross-sectional view of an aerosol can disposal device attached to a waste container.

In FIG. 2, there is shown a cross section of aerosol can waste disposal device 5. In FIG. 2, aerosol can 40 is shown placed in inner cylinder 20 which is threaded at 22 into waste container top 12. Outer cylinder 50 is positioned over cylinder 20. Aerosol can 40 is shown positioned on piercing means 30 just prior to being punctured. A downward force applied to end 52 punctures the bottom of aerosol can 40 to exhaust gases therefrom into container 10. Further, any residual liquid in can 40 is drained, making a complete and safe disposal of materials in the aerosol can.

Figure 3:
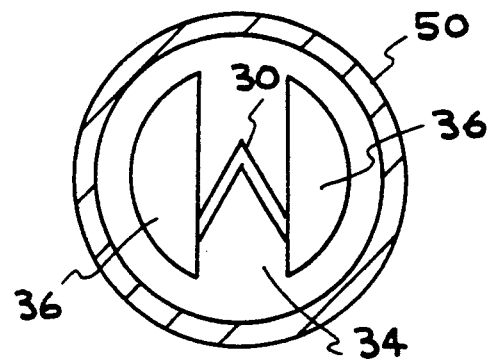
FIG. 3 is a cross-sectional view along the line 3—3 of FIG. 2.

Puncturing or piercing means 30 is shown, in FIG. 2, mounted in the lower portion of inner cylinder 20. Piercing means 30 is shown generally V-shaped (FIG. 3) with a sharp point 32 for ease of piercing the aerosol container bottom. The pointed V-shape permits piercing the bottom of aerosol can 40 while leaving an opening 36 in the aerosol can bottom to exhaust gas or liquid therefrom. Piercing means 30 is mounted on a cross member 34, as shown in FIG. 3, which leaves an opening 36 in the bottom of inner cylinder 20 to permit removal of gases or liquid to the waste container.

Figure 4:
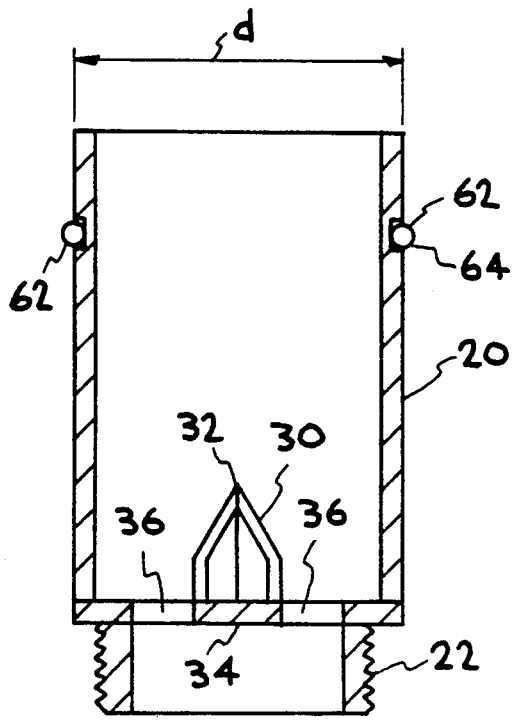
FIG. 4 is a vertical cross-sectional view of another embodiment of the inner cylinder of the aerosol can disposal device.
Figure 5:
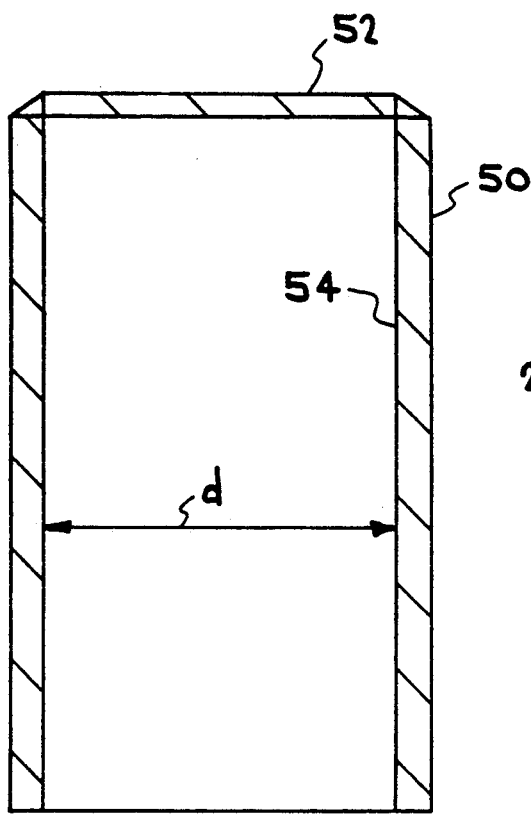
FIG. 5 is a vertical cross-sectional view of an outer cylinder of the aerosol can disposal device.
Figure 6:
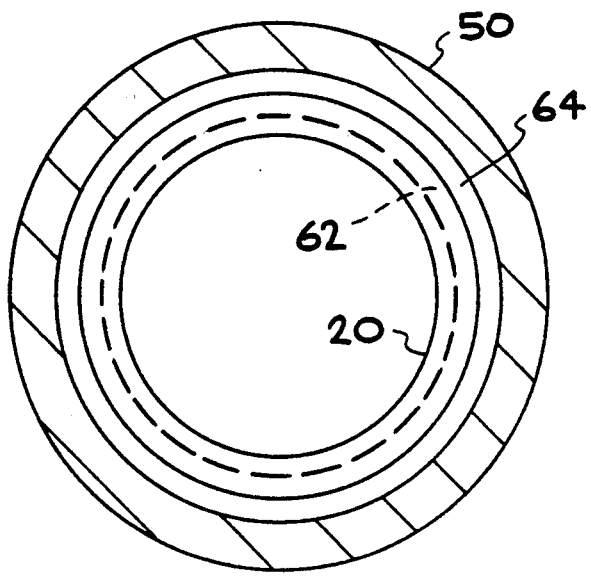
FIG. 6 is a top view in cross-section showing the sealing relationship between the inner cylinder shown in the embodiment of FIG. 4 and the outer cylinder depicted in FIG. 5.

Turning now to FIGS. 4-6, there is shown, in FIG. 4, a cross-sectional view of another embodiment of inner cylinder 20. In this embodiment, a seal means 60 is provided which prevents gases from escaping between the cylinders. Seal means 60 may comprise an annular groove 62 provided in cylinder 20 with an 0-ring 64, of suitable rubber-type material, mounted in annular groove 62. By selection of an o-ring which will provide an outer diameter just slightly larger than d, the inner diameter of outer closed cylinder 50, as shown in FIG. 5, a seal will be provided against inner wall 54 of outer cylinder 50 (see also FIG. 6).

Figure 7:
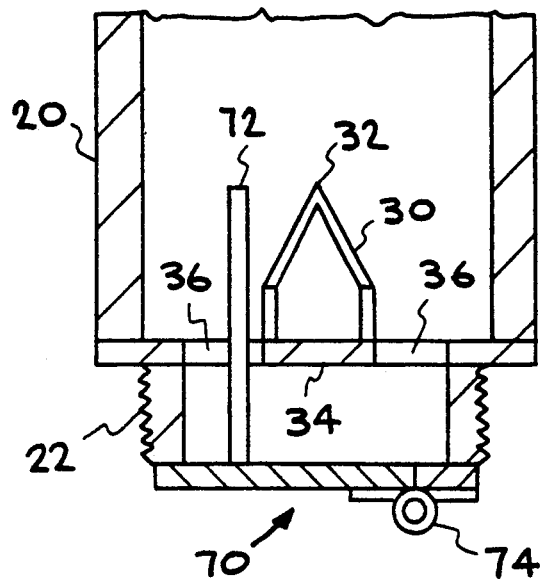
FIG. 7 is a fragmentary vertical cross-section view of another embodiment showing a valve on the inner cylinder to maintain gases exhausted from the aerosol can in the waste container.

In FIG. 7, another embodiment of the invention is shown wherein the lower portion of inner cylinder 20 is provided with a valve means 70 which opens to permit passage of gas and liquid into waste container 10. Valve means 70 can seat against the lower section of threaded portion 22. Valve means 70 may utilize a spring loaded hinge 74 so as to be in the closed position when an aerosol can is not present in inner cylinder 20. Valve means 70 may be opened by arm means 72 which is depressed when the aerosol can is pressed against piercing means 30. Thus, valve means 70 prevents escape of gases or volatile material from container 10, for example, when outer cylinder 50 is removed to permit insertion of another aerosol can. It will be appreciated that valve means 70 may be mechanically operated so as to be closed when not being used. Thus, any well-known valve means may be provided in the lower portion of inner cylinder 20 and container 10 which may be opened or closed, as required.

While the invention has been particularly described with respect to aerosol containers, it will be appreciated that it has application to any container in which it is desired to dispose of ingredients therein without volatile material escaping. Thus, the present invention can have application to used paint containers and solvent containers where it is desirable to dispose of the ingredients in such containers while preventing escape of volatile ingredients therein.

The present invention has the advantage that it is suitable for removing both gases and liquids from containers in the same operation. Thus, residual paint or solvents remaining in aerosol cans, for example, can conveniently be removed in one operation for disposal. The present invention provides a device for more complete disposal of ingredients in containers such as aerosol containers. Thus, the use of aerosol cans as used herein is meant to include paint and solvent containers. Further, while reference is made to inner cylinder and outer cylinder, such configurations as used herein are meant to incorporate generally cylindrical, oval, square or rectangular shapes, etc., as well.

The device in accordance with the invention may be suitably fabricated from mild steel or other such material.

While a specific embodiment of the aerosol can waste disposal device of the invention has been illustrated and described for carrying out the disposal of aerosol cans in accordance with this invention, modifications and changes of the apparatus, parameters, materials, etc., will become apparent to those skilled in the art, and it is intended to cover in the appended claims all such modifications and changes which come within the scope of the invention.

What is claimed is:

1. An aerosol can waste disposal apparatus comprising:
   (a) a disposal container having at least one opening therein:
   (b) an inner cylinder comprising:
      (i) a top portion with an open end for receiving an aerosol can;
      (ii) a lower portion with means for fastening said inner cylinder to said opening in said disposal container; and
      (iii) piercing means mounted in said inner cylinder adjacent said lower portion thereof for puncturing the bottom of said can when said can is placed in said inner cylinder.
   (c) an outer cylinder having an open end and a closed end, and an inner diameter slightly larger than the outer diameter of said inner cylinder to permit said outer cylinder to fit over said inner cylinder in telescoping engagement, the inner surface of said closed end of said outer cylinder adapted for forcing said bottom of said aerosol can in said inner cylinder into engagement with said piercing means to form an opening in said can bottom, thereby permitting the contents of said can to enter said disposal container.
   (d) sealing means comprising an o-ring provided between said inner cylinder and outer cylinder;
   (e) valve means located in said inner cylinder to prevent gases from escaping from said disposal container; and
   (f) opening means attached to said valve means to open said valve means when said can in said inner cylinder is pierced.

2. A waste disposal apparatus comprising:
   (a) an inner cylinder having a top portion having an open end for receiving a can containing a waste liquid and/or gas, said inner cylinder having a lower portion;
   (b) piercing means mounted in said lower portion of said inner cylinder for puncturing the bottom of said can placed in said inner cylinder; and
   (c) an outer cylinder having an open end and a closed end, the outer cylinder adapted for engaging the top portion of said inner cylinder in telescoping engagement, the closed end of said outer cylinder adapted for forcing said can bottom into engagement with said piercing means to form an opening in said aerosol can bottom, thereby permitting the contents of said can to drain from said can.

3. The apparatus in accordance with claim 1 wherein sealing means is provided between said inner cylinder and said outer cylinder.

4. The apparatus in accordance with claim 2 wherein valve means is provided adjacent the lower portion of said inner cylinder to prevent gases from escaping when said inner cylinder is sealingly fastened to a disposal container.

5. The apparatus in accordance with claim 4 wherein opening means is provided in the inner cylinder to open said valve means when said can is punctured.

6. An aerosol can waste disposal apparatus comprising:
   (a) a disposal container having at least one opening therein;
   (b) an inner cylinder comprising:
      (i) a top portion with an open end for receiving an aerosol can;
      (ii) a lower portion with means for fastening said inner cylinder to said opening in said disposal container; and
      (iii) piercing means mounted in said inner cylinder adjacent said lower portion thereof for puncturing the bottom of said can when said can is placed in said inner cylinder; and
   (c) an outer cylinder having an open end and a closed end, and an inner diameter slightly larger than the outer diameter of said inner cylinder to permit said outer cylinder to fit over said inner cylinder in telescoping engagement, the inner surface of said closed end of said outer cylinder adapted for forcing said bottom of said aerosol can in said inner cylinder into engagement with said piercing means to form an opening in said can bottom, thereby permitting the contents of said can to enter said disposal container.

7. The apparatus in accordance with claim 6 wherein an exhaust gas means is provided in association with said disposal apparatus for selectively adsorbing gases removed from said disposal container.

8. The aerosol can waste disposal apparatus of claim 6 wherein sealing means are provided between said inner cylinder and outer cylinder.

9. The aerosol can waste disposal apparatus of claim 8 wherein said sealing means provided between said inner cylinder and outer cylinder comprise an annular groove in a surface of one of said cylinders facing a mating surface of the other of said cylinders with an o-ring seal in said groove.

10. The aerosol can waste disposal apparatus of claim 6 wherein valve means are located in said inner cylinder to prevent gases from escaping from said disposal container.

11. The aerosol can waste disposal apparatus of claim 10 wherein spring bias means maintain said valve in a closed position when no can is present in said inner cylinder.

12. The aerosol can waste disposal apparatus of claim 10 wherein said valve means further comprise arm means attached to said valve means to open said valve means when said can is urged against said piercing means in said inner cylinder.

* * * * *